Oct. 8, 1968    R. D. EMERY ET AL    3,404,834
PRESET COUNTER HAVING ADJUSTABLE CONTROL ELEMENT
Filed May 24, 1967
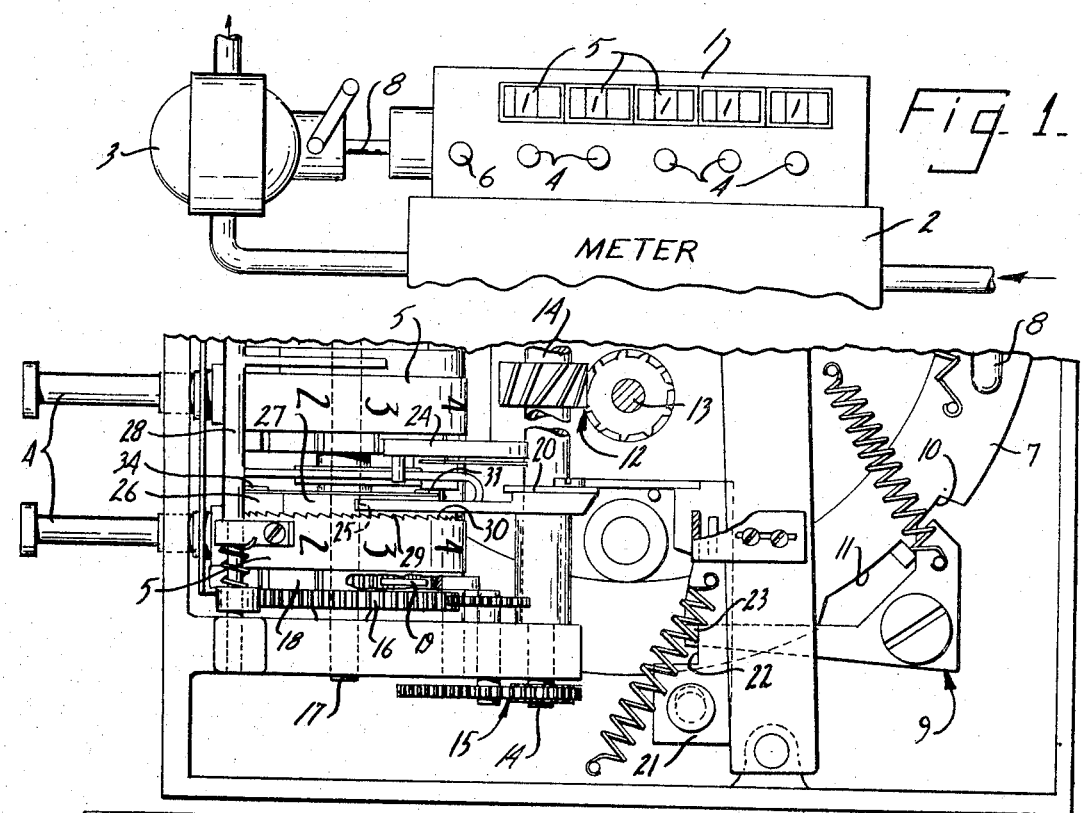
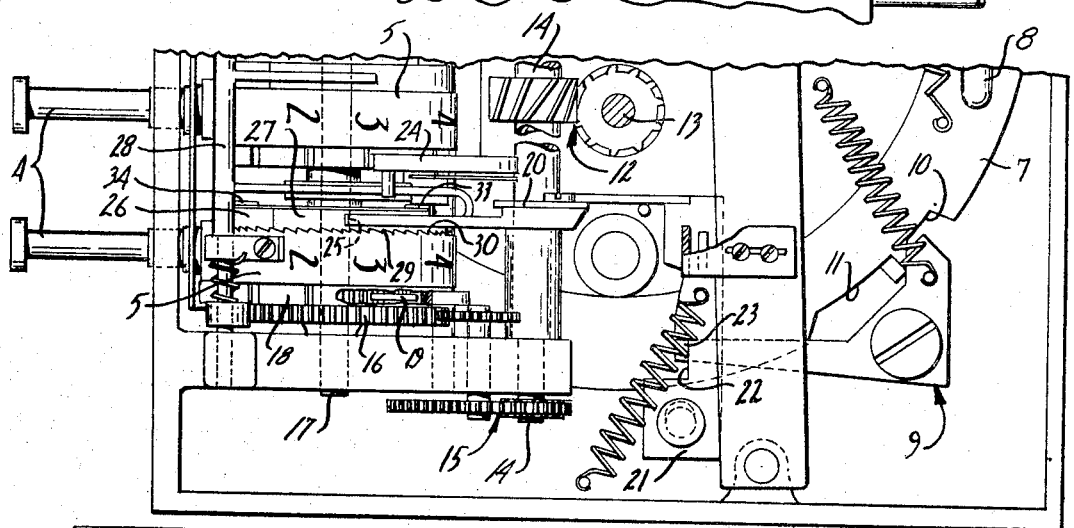
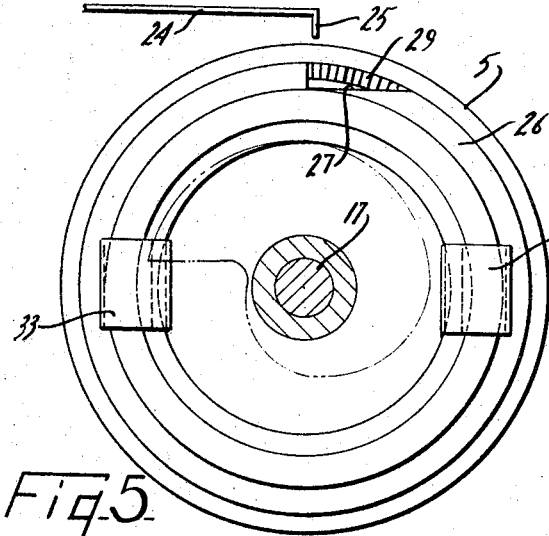
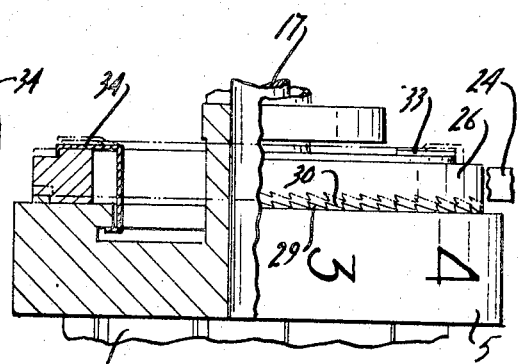
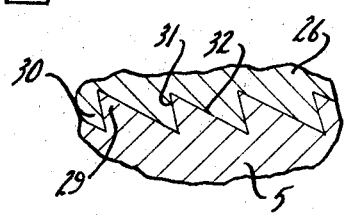
INVENTORS
ROBERT D. EMERY
CHARLES E. FREESE
BY
Andrus & Starke
Attorneys

United States Patent Office 3,404,834
Patented Oct. 8, 1968

3,404,834
PRESET COUNTER HAVING ADJUSTABLE
CONTROL ELEMENT
Robert D. Emery, Northeast, and Charles E. Freese,
Erie, Pa., assignors to A. O. Smith Corporation,
Milwaukee, Wis., a corporation of New York
Filed May 24, 1967, Ser. No. 640,957
4 Claims. (Cl. 235—132)

ABSTRACT OF THE DISCLOSURE

A presettable counter includes indicating display wheels having numbers on the periphery. A ring or cylinder cam is secured to the side face of at least one wheel and has an operating notch in the peripheral surface. The abutting surfaces of the cam and the wheel include meshing teeth having a locking edge and a cam edge. The cam is held against the wheel by generally U-shaped spring clips one arm of which overlies the outer face of the cam and the other of which hooks over a part of the wheel. The spring clips hold the cam to the wheel when the wheel is driven in one direction, but permits opposite rotation of the cam when the wheel is held fixed for adjusting the angular positioning of the cam notch relative to the numbers on the wheel.

---

This invention relates to a predetermined counter and particularly to an interconnection and presetting of an indicating wheel to a control member.

Preset counters are often employed for controlling and terminating operations or functions. For example, preset counters are widely employed in the metering of predetermined quantities of liquid petroleum products. The preset counter includes a plurality of indicating wheels which can be preset from the zero reference position. The counter is coupled to a meter in the flow line. In operation, the preset counter is preset to the desired quantity to be delivered. During flow, the counter is driven in a subtractive manner to the zero reading position. At the zero reading position, it actuates a switch or a mechanical latching means to automatically close the valve and terminate flow. A highly satisfactory preset counter construction is shown in the copending application of Charles E. Freese and Robert D. Emery entitled, Predetermining Counter Apparatus for Flow Control Systems and the Like, Ser. No. 640,956, filed on the same date as the present application. As more fully disclosed therein, the preset counter includes a control ring mechanically latched in a valve open position by a latch lever in response to opening of the valve. A trip or trigger mechanism is connected to the units indicating wheel in such a manner that when the counter reaches zero the control ring is released and the valve closes. The trip mechanism is connected to the units indicating wheel and set to trigger the latch lever when the precise zero reading is established. Although the counter may be factory adjusted, slight adjustment is often required in the installation to properly align the figures on the indicating wheel at shut-off.

The present invention is particularly directed to the indicating wheel which controls a trigger assembly and in particular to a construction wherein such indicating wheel can be readily adjusted with respect to a control member while providing a positive and reliable drive connection therebetween. This invention permits accurate adjustment of the zero trip setting for various systems.

In accordance with the present invention, a selected indicating wheel of a preset counter is rotatably mounted on the shaft to be driven from the flow meter. A control member is connected to the one side of the indicating wheel by a resiliently loaded overriding one-way clutch or drive mechanism. The control member rotates with the wheel under all normal operation, but may be readily rotated in the opposite direction as a result of the drive mechanism. In a particularly novel construction, the control member is a control ring concentrically clamped to one side of the indicating wheel. A spring means urges the ring against the face of the wheel and the abutting faces are provided with complementing and mating ratchet teeth having a locking edge and an opposite inclined cam edge. The ratchet teeth on the wheel and the control ring cooperates through the locking edges to rotate the control ring simultaneously with the rotation of the wheel in the presetting and subtractive rotation of the wheel. However, the control ring can be turned in the opposite direction while positively holding the wheel as a result of the slope of the mating ratchet teeth. When initially installing the system, the zero trip point of the control ring can thereby be readily and easily adjusted with respect to the indicating wheel.

The control member and trigger assembly are coupled in any desired manner; for example, as shown in the above identified application.

The positive and readily adjusted trip point construction is very significant and a practical advance for preset counters requiring accurate control in response to counter operation.

The drawing furnished herewith illustrates a preferred construction of the present invention in which the above advantages and features are clearly disclosed.

In the drawing:

FIG. 1 is a diagrammatic elevational view of a counter device showing the general arrangement of the preset counter in a flow system;

FIG. 2 is a fragmentary plan view showing the internal construction of the units wheel constructed in accordance with the present invention;

FIG. 3 is an enlarged top elevational view of only the indicating wheel and with parts broken away;

FIG. 4 is an enlarged fragmentary view of the indicating wheel and control ring shown in FIGS. 1 and 2 with the respective parts sectioned to more clearly illustrate ratchet teeth construction; and FIG. 5 is a side axial view looking at the cam and wheel.

Referring to the drawings and particularly to FIG. 1, the present invention is diagrammatically shown applied to a control system including a presettable set stop counter 1 interconnected to be driven from or by a meter 2. The meter 2 may be the usual volumetric flow recording meter connected in a flow line with the set stop counter 1 connected to control a flow valve 3. The counter 1 includes a plurality of input shafts or rods 4 projecting forwardly from the front of the counter and with each rod being aligned with one of a plurality of visual display wheels 5 having the numbers 0–9 equicircumferentially carried on the periphery. In the illustrated embodiment of the invention, it is assumed that the display wheels read to a full unit and thus with the illustrated five display wheels can read to 99999.

The preset rods 4 are reciprocally mounted and coupled to preset the individual associated display wheels 5 to any desired digit and thereby preset the counter 1 to any desired gallonage. An emergency stop rod 6 is provided to permit immediate closing of the valve 3 in case of emergencies.

The counter 1 includes an operating or a spring-loaded control ring 7 rotatably mounted in the base of the counter 1 and interconnected by a link or connector 8 to the valve 3 which is manually opened. Opening of the valve 3 moves the link inwardly and rotates the control ring 7.

The control ring 7 is latched in a valve open position by an L-shaped latch arm or lever 9 within the counter mating with a first full-flow notch 10 on the periphery of the ring 7. As illustrated, an immediately adjacent partial-flow notch 11 is provided on ring 7.

In operation, as the preset counter 1 counts toward zero, the latch lever 9 is released before a zero reference reading and releases the ring 7 which rotates until the lever 9 engages the second notch 11. In this position, the valve 3 is held in a partial flow condition until the zero reference is reached at which time the latch lever 9 is again released, the ring 7 rotates and the valve 3 closes. This sequential operation minimizes shock load forces on the structure or in the flow system in accordance with the usual design procedure.

Generally, the drive for the indicating or display wheels 5 and the trigger assembly for the L-shaped latch lever 9 are similar to those disclosed in the previously identified application and are only briefly described herein. The drive assembly for coupling wheels 5 to meter 2 includes a gear coupling 12 from a meter shaft 13 to a drive shaft 14 which is connected by suitable gear trains 15 to an input gear 16 rotatably mounted on a wheel support shaft 17. The unit indicating wheel 5 is rotatably mounted on the shaft 17 and connected to the input gear 16 by an overriding clutch assembly which is shown including a ring ratchet wheel 18 secured to the indicating wheel and a pair of spring loaded pawls 19 secured to the gear 16. The coupling is such as to drive the wheel 5 in a subtractive manner to record the volumetric flow in accordance with the usual drive of a preset counter. The units indicating wheel 5 is interconnected to drive the next wheel 5 which provides the "tens" reading by a cam driven ratchet assembly or any other suitable tens advance mechanism. The succeeding wheels 5 are similarly connected to the preceding wheel to provide the necessary sequential actuation of each higher order wheels to advance one digit for each ten advance of the immediately preceding wheel. The units indicating wheel 5 is also coupled to actuate the trigger assembly for latch lever 9. The trigger assembly includes a crank 20 pivotally mounted on the shaft 14. The lower end of the crank 20 is releasably coupled to engage a spring-loaded sear 21. The sear 21 is provided with a notch 22 within which a lip 23 on one end of the L-shaped latch lever 9 is disposed. The opposite end of the latch lever 23 is disposed to ride on the periphery of ring 7 and cooperate with the notches 10 and 11 to control the movement of the ring 7 and therefore the positioning of the valve 3.

A trigger finger 24 is pivotally secured to the upper end of the crank 20 and extends forwardly with a depending lip 25 aligned with a cam control ring or cylinder 26 which is driven with the numeral wheel. The control cylinder 26 is provided with a right angle notch 27 in the exterior periphery which pulls the trigger finger 24 forwardly to the left in FIG. 5 whenever lip 25 drops into the notch.

The trigger finger 24 is held in a raised position with respect to the cylinder 26 by a comb assembly 28 interconnected to the other higher order indicating wheels 5 and requiring that all of them be in a zero reading position before the trigger finger 24 is released.

When the trigger finger 24 mates with the notch 27, the forward finger movement pivots the crank 20 and the sear 21 to release the latch lever 9; thereby permitting the control ring 7 to move. The control ring 7 rotates until the lever 9 drops into the second notch 11 to again lock the ring with the valve 3 partially closed. This second latch position occurs as the finger 24 rides out of the notch 27 as the units indicating wheel 5 makes its final revolution and before ring 7 moves notch 11 past lever 9. When the notch 27 in the cylinder 26 is again aligned with the finger 24, the latch lever 9 is again tripped to release the control ring 7 which then moves to the valve closed position.

Generally, it is important that the position of the cylinder notch 27 relative to the zero digit on the units indicating wheel be accurately located to establish a zero reading upon closure of the valve 3 and termination of flow.

The present invention is particularly directed to a novel coupling between the control cylinder 26 and the units indicating wheel 5.

As most clearly shown in FIGS. 3 and 4, the wheel 5 is a cast member having the coupling to gear 16 secured to one side and the control cylinder 26 to the opposite side. The cylinder 26 is a solid ring member having an outer diameter somewhat smaller than the wheel 5 and an inner diameter somewhat inwardly of the base of the notch 27. The abutting faces of the cylinder 26 and the unit indicating wheel 5 are provided with complementing ratchet teeth 29 and 30. The teeth 29 and 30 are similarly formed with a generally locking edge 31 projecting inwardly from the clamping face and an inclined camming edge or surface 32 extending therefrom and terminating at the base of the locking edge of the adjacent tooth. The control cylinder is clamped abutting the wheel 5 with the teeth 29 and 30 in mating engagement by a pair of channel-shaped leaf springs 33 and 34 secured to the wheel 5 and overlying the outer edge of cylinder 26. Each spring 33 and 34 includes a shallow leg which hooks over an inner wall of wheel 5 and an outer longer leg overlying the outer face of the cylinder 26.

Each of the springs 33 and 34 is of a sufficient strength to firmly lock the control cylinder 26 to the units indicating wheel 5 with the wheel rotating in the subtractive direction; i.e. with the locking edge 31 as the leading edge. However, if the indicating wheel 5 is rotated in the opposite direction while holding the cylinder 26 the camming edges 32 permit relative movement. The control cylinder 26 will deflect the springs 33 and 34 sufficiently as shown in FIG. 3 to allow the teeth to move over each other. During the normal operation of the preset counter, the indicating wheel 5 and the counter control cylinder 26 are essentially the equivalent of an integral connection.

When initially installing the system or thereafter, the adjustment of the tripping point relative to the numerals on the units indicating wheel 5 is readily accomplished. The counter housing is removed to expose the indicating wheel 5 and the control cylinder 26. The cylinder 26 is held stationary but allowed to move axially such that the ratchet teeth can move over each other in any suitable manner and the wheel 5 is positively turned to reposition the control notch with respect to the indicating numerals. Conversely, the wheel 5 could be held against rotation and the cylinder 26 rotated.

All of the other wheels 5 may be similarly formed with a cam cylinder secured to the one face for positioning of the comb assembly 28.

Applicants have found that the resiliently loaded coupling and particularly the ratchet teeth coupling provide a very simple, reliable and inexpensive means for adjustment of the zero trip point of preset counters and the like.

Various modes of carrying out the invention are contemplated as being within the scope of the following claims particularly pointing out and distinctly claiming the subject matter which is regarded as the invention.

We claim:

1. A presettable counter having a plurality of indicating wheels including a driven indicating wheel having an input connection means and a control member separate from said input connection means adapted to have a predetermined fixed position with respect to said driven wheel and means coupled to said control member for selective positioning by said control member in accordance with the position of the driven wheel, the improvement in the connection of the control member to one side of the driven wheel comprising, a pair of releasably engaging members secured respectively to the control member and the driven indicating wheel, said engaging members having a plurality of spaced cooperating engaging locking surfaces locking the members to each other with the wheel driven in the one direction and cam surfaces joining said locking surfaces, said cam surfaces permitting relative movement in a direction opposite said forward direction, and resilient means connected to the control member and the wheel and loading said members together.

2. The presettable counter of claim 1 wherein the driven indicating wheel is connected to one-way ratchet drive means and said cooperating engaging locking surfaces and cam surfaces define mating ratchet teeth.

3. The presettable counter of claim 1 wherein said control member is a cylinder having a plurality of ratchet teeth on the end abutting the wheel and the wheel includes a similar plurality of ratchet teeth mating with those of the cylinder, and said resilient means includes a plurality of springs connected to the cylinder and the wheel and urging the cylinder and wheel in axially opposed directions.

4. The presettable counter of claim 1 wherein said control member is a cylinder having a plurality of ratchet teeth on the end abutting the wheel and the wheel includes a similar plurality of ratchet teeth mating with those of the cylinder, and said resilient means includes a pair of generally U-shaped springs mounted to opposite sides of the cylinder and each having a first arm hooked over the exterior face of the cylinder and the other arm hooked over an inner portion of the wheel.

References Cited

UNITED STATES PATENTS

| | | | |
|---|---|---|---|
| 1,940,134 | 12/1933 | Levin | 235—1 |
| 2,920,819 | 1/1960 | Greenhow | 235—117 |
| 3,022,946 | 2/1962 | Glass et al. | 235—117 |
| 3,231,191 | 1/1966 | Berck | 235—132 |

RICHARD B. WILKINSON, *Primary Examiner.*

S. A. WAL, *Assistant Examiner.*